United States Patent
Refai et al.

(10) Patent No.: US 6,442,395 B1
(45) Date of Patent: Aug. 27, 2002

(54) MODIFIED DIRECTED RETRY FEATURE

(75) Inventors: Wail Refai, Apex; Nadi Sakir Findikli, Cary; Tony Sammarco, Garner; Chris Lamb, Hillsborough, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/470,545

(22) Filed: Dec. 22, 1999

(51) Int. Cl.$^7$ .............................. H04B 7/00; H04Q 7/20
(52) U.S. Cl. .................. 455/510; 455/513; 455/515; 455/436; 455/437; 370/329; 370/331
(58) Field of Search ................... 455/510, 511, 455/513, 517, 403, 422, 434, 436, 437, 161.1, 442, 161.3, 515; 370/329, 331

(56) References Cited

U.S. PATENT DOCUMENTS

| | | | | |
|---|---|---|---|---|
| 5,740,535 A | * | 4/1998 | Rune ........................ | 455/437 |
| 5,806,002 A | * | 9/1998 | Wiatrowski et al. ........ | 455/512 |
| 5,940,761 A | * | 8/1999 | Tiedemann, Jr. et al. ... | 455/437 |
| 6,119,003 A | * | 9/2000 | Kukkohovi ................. | 455/435 |
| 6,151,502 A | * | 11/2000 | Padovani et al. ........... | 455/442 |
| 6,195,552 B1 | * | 2/2001 | Jeong et al. ................. | 455/436 |
| 6,201,969 B1 | * | 3/2001 | Meier ......................... | 455/442 |
| 6,216,009 B1 | * | 4/2001 | Barnett ....................... | 455/510 |
| 6,278,703 B1 | * | 8/2001 | Neufeld ...................... | 370/342 |

* cited by examiner

*Primary Examiner*—Fan Tsang
*Assistant Examiner*—Marceau Milord
(74) *Attorney, Agent, or Firm*—Coats & Bennett, P.L.L.C.

(57) ABSTRACT

A method for rapidly processing a directed retry ("DR") message on a mobile station while the mobile station is void of an up-to-date neighbor list or in the process of completing neighbor list measurements. In one aspect of the invention, the method comprises the steps of receiving a directed retry message on a mobile station; setting SCANINTERVAL to zero and HL_FREQ to high if an up-to-date neighbor list does not exist on the mobile station; completing at least one neighbor list measurement within a wait time period; and invoking RTC-4. The step of completing the least one neighbor list measurement is accomplished within a wait time of about four seconds. The step of completing the least one neighbor list measurement preferably comprises completing 2 neighbor list measurements. If the wait time exceeds about four seconds the mobile station reverts to camping or idle condition.

8 Claims, 3 Drawing Sheets

MODIFIED DIRECTED RETRY FEATURE

FIELD OF THE INVENTION

This invention relates to communication systems. Specifically, the invention is directed to the processing of a directed retry instruction received by a mobile station operating within a cellular network.

BACKGROUND OF THE INVENTION

A description of cellular radio systems is found in *Cellular Radio Systems*, published by Artech House, Boston (editors: D. M. Balston and R. C. V. Macario; ISBN: 0-89006-646-9); *Digital Cellular Radio* written by G. Calhoun and published by Artech House, Boston (ISBN: 0-89006-266-8); and standard TIA/EIA-136 Rev A 800/1900 MHz *TDMA Cellular-Radio interface-Mobile Station-Base Station Compatibility*, Nov. 20, 1998. *Cellular Radio Systems*, Digital Cellular Radio, and "TIA/EIA-136 Rev A" are hereby incorporated by reference in their entirety.

A cellular mobile telecommunications system includes a mobile station communicating with any one of a plurality of geographically spaced base stations. Broadly, each base station defines a cell, and each cell forms an integral part of a larger cellular network. The size of a cell largely depends on the power rating of the corresponding base station. The base stations communicate with a mobile switching station by means of intercellular trunk lines. The mobile switching center determines which of the base stations and channels should process a call with the mobile station based on considerations such as signal strength between each available channel and the mobile station.

When the mobile station has a digital control channel ("DCCH") or an analog control channel ("ACC"), the mobile station can receive or initiate a call. The terms "initiate" and "originate" will hereafter be regarded as equivalent terms. Specifically, the mobile station can receive or originate a call via a channel when the signal strength is satisfactory between the mobile station and a base station. If the mobile station travels out of a first cell into a second cell and there is no channel available in the second cell, the mobile station can attempt to keep the channel provided by the base station in the first cell. Sometimes the geography between first cell and the second cell is such that the signal strength is compromised. In these circumstances the mobile station can attempt to find an unused channel on a base station in a third cell. Switching between base stations can be handled by a switching station in communication with a service provider.

The mobile station can maintain information concerning base stations ("neighbor stations") in neighbor cells in the form of a neighbor list. The mobile station can verify signal strength, i.e. make a "neighbor list measurement", between itself and a neighbor station. The industry requirement is to take at least five valid neighbor list measurements at intervals prior to making a decision to switch to a new control channel.

If another caller is making a page attempt to the mobile station or the mobile station is attempting a call and the services within a cell are saturated, the call may fail. To avoid this, the cellular network can broadcast via a base station a directed retry message to the mobile station. This will cause the mobile station to tune to a different channel. On receiving the directed retry message (see e.g. TIA/EIA-136–140), the mobile station can select a neighbor station from the neighbor list and thereby invoke a reselection trigger condition type 4 ("RTC-4") to initiate a Candidate Eligibility Filtering procedure in order to attempt a channel reselection.

After the mobile station invokes the RTC-4 condition, it can initiate the process of responding to a page or completing a call attempt as is well known in the art. Unfortunately, timeout can occur if the mobile station receives a directed retry message while in the process of obtaining a new set of neighbor list measurements. Instead of responding to a directed retry message by invoking RTC-4 condition, the call origination attempt or page attempt fails and the mobile station reverts to camping or idle mode. Alternatively, the neighbor list might be stale and the mobile station is about to update the neighbor list when the mobile station receives a directed retry message causing the would be incoming page or outgoing call to fail causing the mobile station to revert to camping mode without directed retry.

In normal circumstances there is usually enough capacity in the cell on which the mobile station is camped, a directed retry message is not broadcast and the incoming page or outgoing originated call is processed by the mobile station. Specifically, the page attempt or call is successful and the mobile station uses the cell base station to handle the page or call communication.

The present invention is directed toward to overcoming one or more of the problems discussed above in a novel and simple manner.

BRIEF SUMMARY OF THE INVENTION

In accordance with the invention there is provided a system and method of handling a directed retry message to significantly increase the chances of establishing a channel of communication between the mobile station and base station.

Broadly, there is disclosed herein a method of rapidly processing a directed retry message received by a mobile station while the mobile station does not have an up-to-date neighbor list or is in the process of completing a set of neighbor list measurements. The method comprises the steps of receiving a directed retry message on a mobile station; if an up-to-date neighbor list does not exist on the mobile station, setting SCANINTERVAL to zero and HL_FREQ to high; completing at least one neighbor list measurement; and invoking RTC-4. The step of completing the least one neighbor list measurement is accomplished within a wait time of about four seconds. The step of completing the least one neighbor list measurement preferably comprises completing two-neighbor list measurements. If the wait time exceeds about four seconds the mobile station reverts to camping or idle condition.

It is a feature of the invention to process a directed retry message immediately after channel selection.

It is a feature of the invention to reduce the time taken to calculate neighbor measurements on a mobile station that has received a directed retry message immediately after selection.

It is a feature of the invention to provide an improved method for increasing the chance of a successful page or call origination when a mobile station receives a directed retry message.

It is a feature of the invention that a mobile station can invoke RTC-4 condition with fewer than five neighbor list measurements.

BRIEF DESCRIPTION OF THE DRAWINGS

The following is a brief description of the drawings that are presented for the purposes of illustrating the method and not for purposes of limiting the same.

DETAILED DESCRIPTION OF THE INVENTION

While the invention will be described in connection with one or more embodiments, it will be understood that the invention is not limited to those embodiments. On the contrary, the invention includes all alternatives, modifications, and equivalents as may be included within the spirit and scope of the appended claims.

Figure 1:
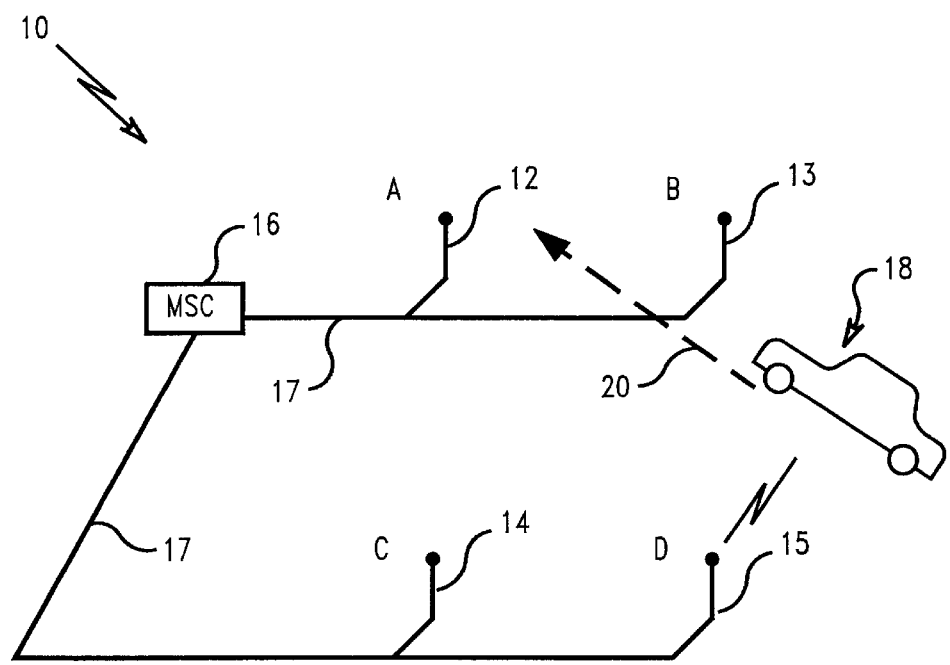
FIG. 1 is a perspective view of a cellular mobile telecommunication system.

Referring initially to FIG. 1, a cellular mobile telecommunication system 10 of conventional construction is illustrated. As is well known, the cellular system 10 is defined by plural cells, including representative cell locations A, B, C and D. Each cell A–D includes a respective base station 12, 13, 14, and 15. Each of the base stations 12–15 communicates with a mobile switching center 16 via intercellular trunks 17. A mobile station, represented at 18, may consist of, for example, a cellular phone, carried by a user in an automobile. However, as is apparent, the mobile station may comprise any known form of mobile station capable of communicating with the cellular mobile telecommunication system 10.

The communication system 10 is operable to select from one of the base stations 12–15 to process a call with mobile station 18. As illustrated, the mobile station 18 is located in cell location D. Consequently, a cellular channel associated with base station 15 would handle the call in progress. If the mobile station 18 is stationary, then the call would likely be handled until completion by the base station 15. However, if the mobile station is moving, then it could cross into different cells. For example, as illustrated, the mobile station 18 might be moving in a direction as indicated by the dashed line 20 and traverse into cell location B and subsequently cell location A. A typical cellular mobile telecommunication system 10 utilizes handoffs to hand a call off from a channel of the base station 15 to a channel of the base station 13, and subsequently from the base station 13 to the base station 12, as the mobile station traverses from cell location D to respective cell locations B and A.

The cellular telecommunication system 10 does not itself form part of the invention. Instead, the invention relates to handling directed retry messages received during or just after channel reselection is in progress.

Presently, standard IS-136 forms a compatibility standard for cellular mobile telecommunication systems. This standard ensures that a mobile station can obtain service in any cellular system manufactured and utilized according to that standard. The standard for IS-136 is hereby incorporated by reference.

A mobile station can normally receive a page, initiate a call, or maintain a call providing all the resources in a cell are not busy. When there is no channel available, a directed retry message can be transmitted to and processed by the mobile station as is well known in the art.

Figure 2:
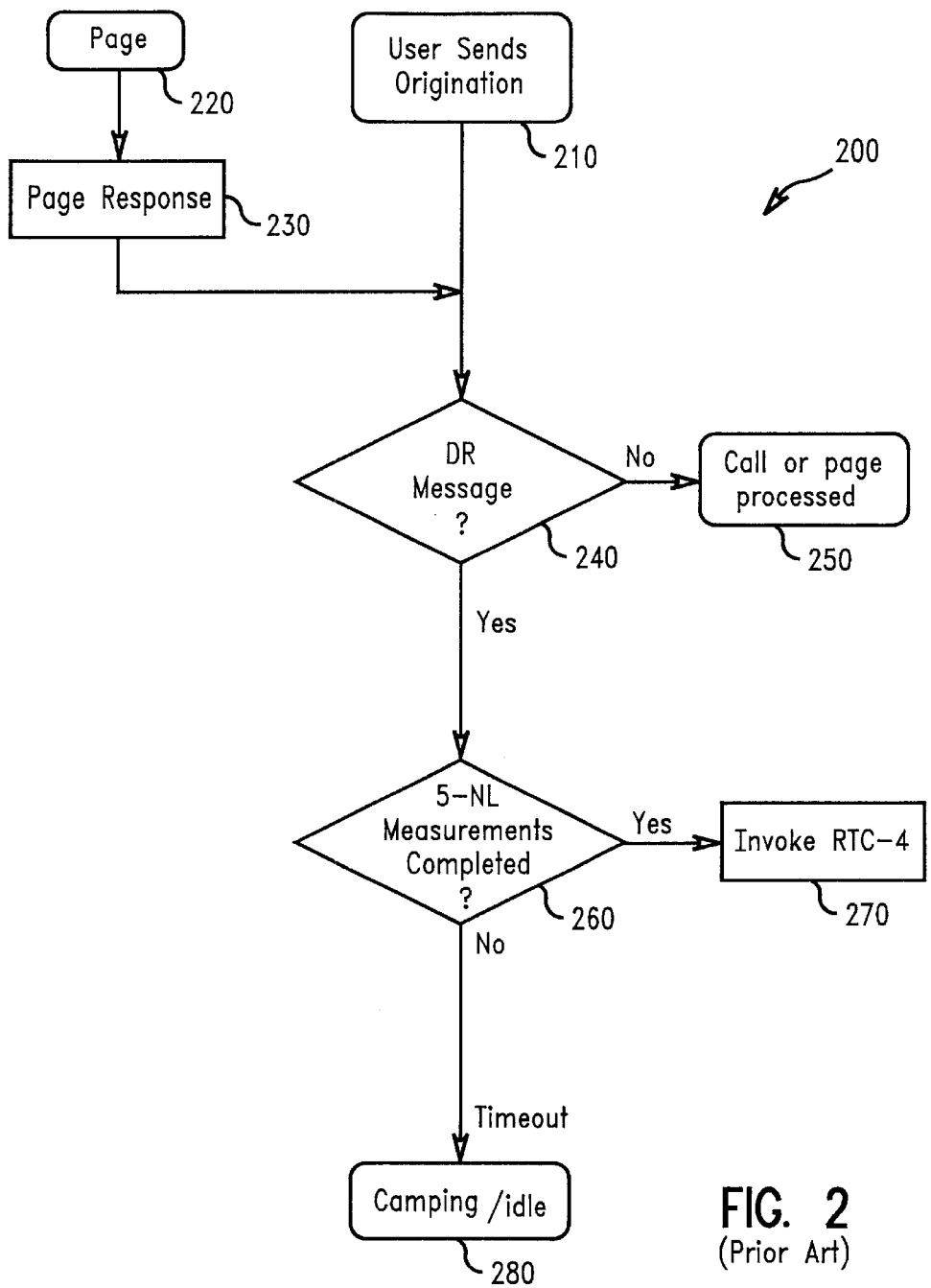
FIG. 2 illustrates a flow chart depicting the logic steps in processing a directed retry message according to the prior art.

Referring to FIG. 2, which illustrates a flow chart 200 depicting the logic steps in processing a directed retry ("DR") message according to the prior art, a mobile station can normally initiate or maintain a call 210. Alternatively, a communicator can initiate a page at 220. A page response at 230 verifies whether the mobile station can take the page. As is well known in the art, a directed retry message can be transmitted to the mobile station. The mobile station checks for a directed retry message at 240. In the absence of a directed retry message, the mobile station handles the incoming page or outgoing call at 250. Alternatively, if the mobile station detects that a directed retry message has been received, the mobile station then checks for five completed neighbor list measurements at 260. If five neighbor list measurements are available, condition RTC-4 is invoked at 270. In contrast, if five neighbor list measurements are unavailable or in the process of being completed, RTC-4 is not invoked and the mobile station fails to handle the incoming page or originate the outgoing call. The mobile station reverts back to camping/idle mode at 280 wherein the mobile station failed to take the page or initiate a call.

It should be understood that a directed retry is a tool well known in the art for increasing the traffic handling capacity of a cellular system. Specifically, it is a software program which routes traffic to alternate cell sites in a cellular telephone system when high traffic conditions make handoff to the preferred cell site impossible.

It should be understood that invoking RTC-4 condition is part of the channel reselection procedure wherein RTC-4 in turn invokes the Candidate Eligibility Filtering procedure and thereby initiate the process of receiving a page or completing a call attempt as is well known in the art.

As is well known in the art, a mobile station allocates a measurement_interval to calculate signal strength for each identified frequency. The variable "SCANINTERVAL" represents the basic measurement_interval in Hyperframes. SCANINTERVAL is set by a cellular network operator ("operator") and is broadcast to the mobile station. In a geographical area of low cellular communication traffic ("low traffic") and in country borders with different operators such as in the European Union, the operators can set SCANINTERVAL up to sixteen Hyperframes intervals and thereby control the sleep mode interval on the mobile station. Increasing the sleep mode time interval can increase battery life.

Another well-known variable is "HL-FREQ". HL_FREQ is used to modify SCANINTERVAL for each entry in the neighbor list. Specifically, if HL_FREQ is set to HIGH, the measurement_interval for the associated neighbor list entry is SCANINTERVAL. Whereas if HL_FREQ is set to LOW, the measurement_interval for the associated neighbor list entry is twice the value stored in SCANINTERVAL.

Whenever there is a change in either the SCANINTERVAL or the entries in the neighbor list, the mobile station computes the measurement_interval for each entry in the neighbor list. The measurement_interval is set to SCANINTERVAL when scanning DCCH, Private Operating Frequencies ("POF") and any DCCH identified as a result of Non-Public Mode Search ("NPS-DCCH").

A mobile station's current Paging Frame Class ("PFC") influences the computation of the measurement_interval. Specifically, the mobile station measures the signal strength of available DCCHs, POFs, NPS-DCCH, and all viable neighbor list entries each time their associated measurement_interval lapses. The signal strength results are processed according to the reselection criteria in IS-136. Thus, a neighbor list entry is considered viable if it is operating in a hyperband supported by the mobile station; has a network type supported by the mobile station; and uses a form of modulation supported by the mobile station.

As an example, for the case where the neighbor list contains 8 entries having HL_FREQ=1, and 8 entries having HL_FREQ=0, and SCANINTERTVAL=0, the following would result:

for the serving DCCH, measurement_interval=1 Hyperframe;

for neighbor list entries having HL_FREQ=1, measurement_interval =1 Hyperframe;

for neighbor list entries having HL_FREQ=0, measurement_interval =2 Hyperframes; and the total number of signal strength measurements made per Hyperframe will then be 1+8+(8*½)=13 (includes the serving DCCH).

In the prior art, the mobile kept a running average of the last five signal strength measurements (referred to as Long_RSS) for each measured frequency. Additionally, the mobile station kept a running average of the last two signal strength measurements of the current DCCH (referred to as Short_RSS). The interval for signal strength measurements for any given frequency was determined by measurement_interval. Upon camping on a control channel the Full_reselect_data_indicator was reset and after collecting 5 signal strength measurements for the neighbor list, the Full_reselect_data_indicator was set to show that the valid average Long_RSS values were available and neighbor list channels could be considered for reselection purposes. Problems would arise if a directed retry message was received (see FIG. 2) while neighbor list entries were being updated. Specifically, the mobile station would go into camping mode without correctly handling the page or originating a call resulting in a failed page or failed call. It is this kind of failure that the present invention is directed to solve.

In the present invention, the probability that the mobile station will succeed in reselecting a control channel from the neighbor list is significantly increased when a directed retry message is received while the mobile station is in the process of completing the neighbor list measurements. Specifically, the invention significantly reduces the probability of a failure occurring during a page or origination attempt when a directed retry massage is received during the completion of five-neighbor list measurements.

In addition to the prior art wherein RTC-4 is immediately invoked if a directed retry message is received after calculating five-neighbor list measurements, the mobile station of the present invention shall:

invoke RTC-4 immediately if a DR message is received after the first two-neighbor list measurements;

delay invoking RTC-4 if a directed retry message is received during the time taken to complete the first two-neighbor list measurements, the mobile station sets SCANINTERVAL=0 and HL_FREQ=High, then the mobile station waits while two-neighbor list measurements are completed within a wait time set to about 4 seconds; and if the two-neighbor measurements are not completed within the wait time, the mobile station shall invoke the scanning and locking proceeding to enter the camping state according to IS-136.

It should be understood that present invention will otherwise handle the reselection procedure in much the same way as described in IS-136. Specifically, the reselection procedure shall comprise of three distinct sequential components:

the reselection trigger condition (RTC) shall identify the conditions responsible for invoking the Candidate Eligibility Filtering;

the Candidate Eligibility Filtering procedure specifies the criteria for the eligibility and filtering of candidate control channels; and the Candidate Reselection Rules procedure shall use the candidates identified by the Candidate Eligibility Filtering procedure to determine if a control channel reselection will take place.

It should be understood that the wait time on the mobile station of the present invention is set not to conflict with the cellular network. Specifically, with respect to both page and call origination attempts, care should be taken to ensure that the network does not time-out the mobile station while, for example, the mobile station is completing the first two-neighbor list measurements.

Figure 3:
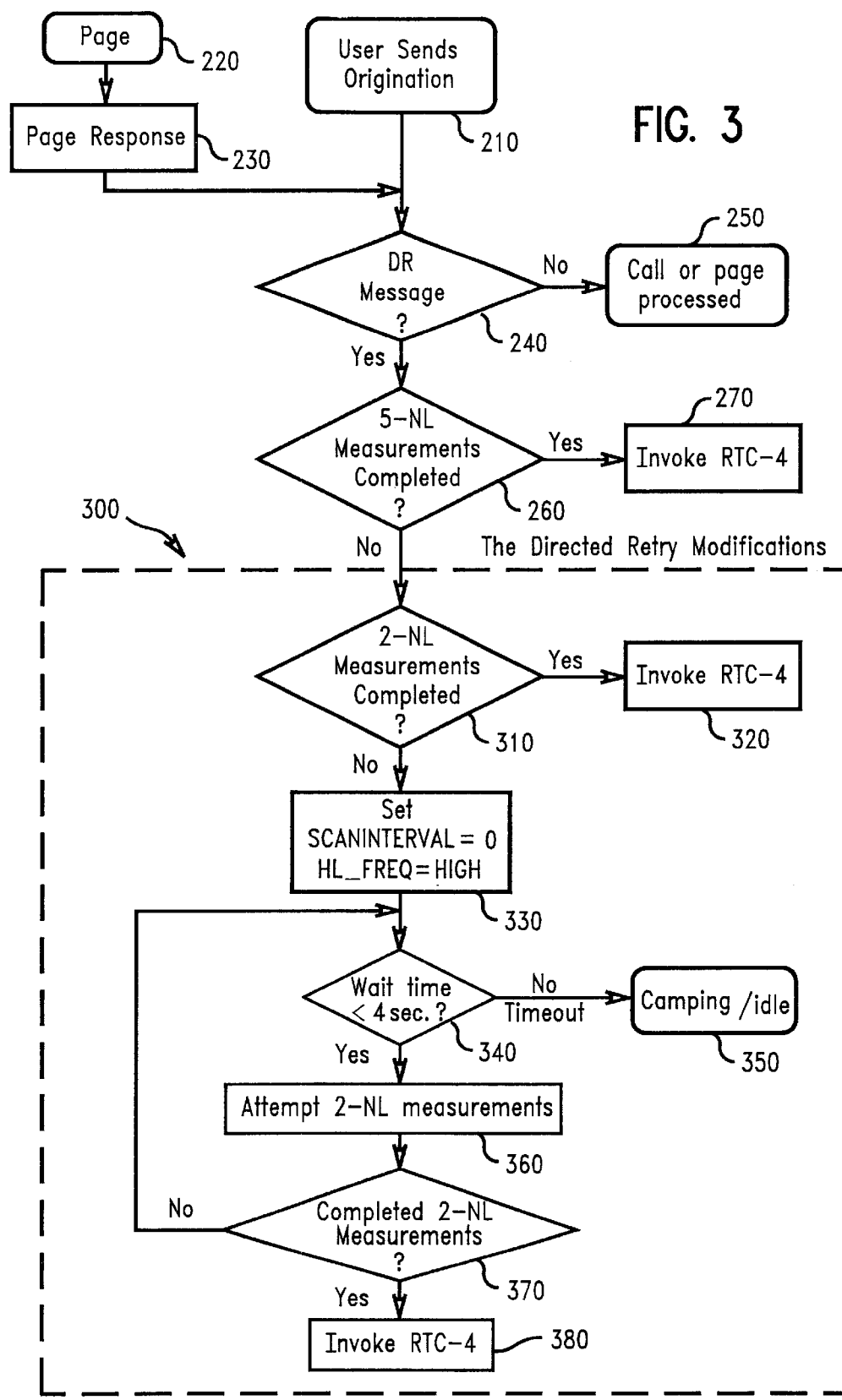
FIG. 3 illustrates a flow chart depicting the logic steps in processing a directed retry message according to one aspect of the invention.

Referring to FIG. 3, which illustrates a flow chart depicting an improved method of handling a directed retry message according to one aspect of the invention, a modified directed retry procedure is shown enclosed in box 300. If a directed retry message has not been received at the block 240, then the incoming page or outgoing call is handled normally by the mobile station at 250. If a directed retry message is confirmed at 240, a check for five neighbor list ("NL") measurements is performed at 260. If five neighbor list measurements are complete then RTC-4 condition is immediately invoked at 270. If five-neighbor list measurements are not completed, the mobile station shall check at 310 to see if two neighbor list measurements have been completed. If two neighbor list measurements are available, RTC-4 condition is immediately invoked at 320. If two neighbor list measurements are not completed, SCANNINTERVAL is set to zero and HL-FREQ is set to high at 330. Within a wait time of about four seconds set at block 340, two-neighbor list measurements are attempted 360. A check for two completed neighbor list measurements is performed at 370. If two neighbor list measurements are not available, the process loops back to the block 340. If two neighbor list measurements are available, RTC-4 condition is invoked at 380. If the wait time expires, i.e. time out occurs at the block 340, then the mobile station switches to camping mode at 350 having failed to acquire channel selection to handle the incoming page or outgoing call origination. However, it can be seen that the improved method of handling a directed retry message significantly increases the chances of invoking the RTC-4 condition and beginning the process of performing a channel selection in order to complete the call origination or handle the incoming page.

In more detail, when the mobile station receives a directed retry message before the first two neighbor list measurements are completed, the mobile station buffers the directed retry message and delays the invocation of RTC-4. In this aspect of the invention, HL_FREQ is set to HIGH (i.e. HL_FREQ=HIGH) and SCANINTERVAL is set to zero (i.e. SCANINTERVAL=0). With these settings, the mobile station is forced to calculate each neighbor list measurement within each Hyperframe (1.26 sec). Two-neighbor list measurements should only take 2.52 seconds. Thus, with a wait time set to 4 seconds there is sufficient time to calculate two neighbor list measurements. Indeed, the wait time could be set to about 3 seconds.

In one embodiment of the invention, with a wait time of N seconds the mobile station will delay invoking RTC-4 for N seconds and stay in the Waiting for Order ("WAFO") state or Origination Proceeding state if a directed retry message is received during the calculation of two-neighbor list measurements. Wait time can have any value between about 2 seconds and about 6 seconds, preferably in the range between about 3 seconds and five seconds, and most preferably about 4 seconds.

It should be understood that while two attempts at neighbor list measurements (at 360 in FIG. 3) is preferred, it is quite feasible that three-neighbor list measurements could be attempted within a set wait time of four seconds given that each neighbor list measurement should not take longer than about 1.26 seconds. Thus, there is considerable flexibility within the method of the invention. For example, if only one neighbor list measurement is attempted at 360, then the wait time could be reduced to about 2 seconds. Alternatively for one-neighbor list measurement at 360 and a wait time of four seconds, several cycles around 375 (FIG. 3) would be possible prior to time out and the mobile station switching to camping mode without succeeding in selecting a channel and processing the page or call origination (350 in FIG. 3). For three neighbor list measurement attempts, the wait time could be set to about 5 seconds; setting wait time to 6 seconds could allow one re-attempt at 375 to complete a set of three neighbor list measurement.

In another aspect of the invention, on receiving a directed retry message the mobile station is programmed to invoke a channel reselection procedure if at least two neighbor list measurements are complete. If two-neighbor list measurements are not complete then the mobile station shall complete at least one neighbor list measurement, preferably two neighbor list measurements. The at least one neighbor list is attempted within a wait time, and upon completion of at least one neighbor list measurement the mobile shall invoke the channel reselection procedure. The wait time is preferably in the range between about 2 seconds and 6 seconds, and more preferably in the range between about 3 seconds and 5 seconds. The wait time is most preferably about 4 seconds. If the wait time expires prior to completing at least one neighbor list measurement, the mobile station can revert to camping or idle mode without handling the page or originating the call.

However, the probability of successfully handling a call origination or incoming page is significantly improved.

While the invention is described above in connection with preferred or illustrative embodiments, these embodiments are not intended to be exhaustive or limiting of the invention. Rather, the invention is intended to cover all alternatives, modifications and equivalents included within its spirit and scope of the invention, as defined by the appended claims.

What is claimed is:

1. A method of completing a call in response to a directed retry message received at a mobile station, the method comprising:

determining whether a predetermined number of neighbor list measurements is complete;

delaying a channel reselection procedure for a predetermined period in response to the directed retry message if the predetermined number of neighbor list measurements has not been completed;

performing an additional number of neighbor list measurements during the predetermined period; and invoking the channel reselection procedure if the predetermined number of neighbor list measurements is completed before the end of the predetermined period.

2. The method of claim 1 wherein delaying a channel reselection procedure for a predetermined period comprises buffering the directed retry message.

3. The method of claim 2 wherein delaying a channel reselection procedure for a predetermined period further comprises setting a wait time that determines the length of the predetermined period.

4. The method of claim 3 wherein delaying a channel reselection procedure for a predetermined period further comprises setting a measurement interval parameter to accelerate the neighbor list measurements.

5. The method of claim 4 wherein performing an additional number of neighbor list measurements comprises calculating at least one additional neighbor list measurement.

6. The method of claim 5 wherein each additional neighbor list measurement is calculated within the period defined by the measurement interval parameter.

7. The method of claim 1 further comprising reverting to a camping state or idle condition if the predetermined period ends before completing the predetermined number of neighbor list measurements.

8. The method of claim 1 further comprising:

determining whether a neighbor list is stale;

delaying a channel reselection procedure for a predetermined period in response to the directed retry message if the neighbor list is stale;

performing a predetermined number of neighbor list measurements during the predetermined period; and invoking the channel reselection procedure if the predetermined number of neighbor list measurements is completed before the end of the predetermined period.

\* \* \* \* \*

UNITED STATES PATENT AND TRADEMARK OFFICE
CERTIFICATE OF CORRECTION

PATENT NO. : 6,442,395 B1
DATED : August 27, 2002
INVENTOR(S) : Wail Refai et al.

It is certified that error appears in the above-identified patent and that said Letters Patent is hereby corrected as shown below:

Column 2,
Lines 42 and 44, replace "the least" with -- at least --

Column 3,
Lines 54 and 58, replace "IS-136" with -- TIA/EIA-136 --

Column 4,
Line 63, replace "IS-136" with -- TIA/EIA-136 --

Column 5,
Lines 59 and 62, replace "IS-136" with -- TIA/EIA-136 --

Column 6,
Line 54, replace "1.26" with -- 1.28 --
Line 55, replace "2.52" with -- 2.56 --

Column 7,
Line 6, replace "1.26" with -- 1.28 --

Signed and Sealed this

Twenty-second Day of April, 2003

JAMES E. ROGAN
*Director of the United States Patent and Trademark Office*